(12) United States Patent
Liusvaara

(10) Patent No.: US 9,553,960 B1
(45) Date of Patent: Jan. 24, 2017

(54) LOUDSPEAKER WITH LAMINATE PANEL FOR MOBILE COMPUTING PLATFORMS

(71) Applicant: Intel Corporation, Santa Clara, CA (US)

(72) Inventor: Tapio Liusvaara, Tampere (FI)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/846,588

(22) Filed: Sep. 4, 2015

(51) Int. Cl.
*H04M 1/00* (2006.01)
*H04M 1/02* (2006.01)
*H04R 1/02* (2006.01)

(52) U.S. Cl.
CPC ............ *H04M 1/026* (2013.01); *H04R 1/021* (2013.01); *H04R 2499/11* (2013.01)

(58) Field of Classification Search
None
See application file for complete search history.

(56) References Cited

U.S. PATENT DOCUMENTS

| | | | |
|---|---|---|---|
| 2010/0067726 A1* | 3/2010 | Suzuki .................. | G06F 1/1605 381/333 |
| 2011/0000720 A1 | 1/2011 | Mao et al. | |
| 2014/0184151 A1 | 7/2014 | Han et al. | |
| 2014/0328504 A1* | 11/2014 | Stephanou ............. | H04R 17/00 381/190 |
| 2015/0116178 A1 | 4/2015 | Kim et al. | |
| 2015/0126112 A1 | 5/2015 | Park et al. | |
| 2015/0162767 A1 | 6/2015 | Oh et al. | |

FOREIGN PATENT DOCUMENTS

| | | |
|---|---|---|
| KR | 101163574 | 7/2012 |
| KR | 20140098047 | 8/2014 |
| KR | 20150067673 | 6/2015 |

OTHER PUBLICATIONS

International Search Report and Written Opinion for International Patent Application No. PCT/US2016/045600, mailed on Nov. 17, 2016.

* cited by examiner

*Primary Examiner* — Creighton Smith
(74) *Attorney, Agent, or Firm* — Green, Howard & Mughal LLP

(57) ABSTRACT

Systems and methods enhancing loudspeaker audio performance in thin devices, such as mobile computing platforms and/or communication handsets. In some embodiments, a laminate panel including a dielectric membrane and one or more conductive traces forming an inductive loop suitable wireless charging and/or near field communication (NFC) element is employed as a loudspeaker driven at audio frequencies. In some embodiments, the laminate panel is driven with one or more piezoelectric element. In some embodiments, the laminate panel is of a stiffness and mass to provide a frequency response distinct from that of integrated micro-speakers for a 2.1 audio solution with wider bandwidth than is possible with micro-speakers employing back-side cavities. In some embodiments, the frequency spectrum spanned by the laminate panel loudspeaker enables a tweeter design lacking back-side cavities for smaller device form factor. In some ultra-small form factors, micro-speakers may be eliminated from the platform with the laminate panel providing the only loudspeaker diaphragm for the mobile platform.

22 Claims, 10 Drawing Sheets

LOUDSPEAKER WITH LAMINATE PANEL FOR MOBILE COMPUTING PLATFORMS

BACKGROUND

Noting that sound is created by the fluctuation of air pressure caused by the movement and/or vibration of a given object, the impact of loudspeaker size on loudspeaker performance is clear. It is also apparent that with the trend toward slim/thin form factors in mobile computing platforms, such as smart phones and other mobile/wearable devices, it is increasingly difficult for device manufacturers to design loudspeaker solutions. The size of loudspeakers that fit inside modern mobile devices are simply too small to move large volumes of air. As a result, loudspeaker performance in mobile devices has stagnated or even degraded in recent years.

FIG. 1A illustrates a mobile computing device assembly 101, which includes a chassis 102 and a pair of micro-speakers 105 affixed to chassis 102. A display, microprocessor and other integrated circuitry, as well as a battery may be installed into assembly 101 in any conventional manner. During device operation, loudspeaker membrane movement within micro-speaker 105 is to generate audio output 115. Micro-speaker(s) 105 is driven to provide monaural or stereo output. Micro-speakers 105 are typically tuned to a resonance frequency that enables greater loudness or sound pressures. FIG. 1A further illustrates a conventional micro-speaker design employing a back-side cavity 110, also known as an "air spring" which reinforces the micro-speaker sensitivity (loudness). The back-side cavity encloses a back-side of the loudspeaker membrane opposite a front cavity through which the sound is outlet. The size of the back-side cavity is a function of the micro-speaker design and desired frequency response. Often, a third, or more, of a micro-speaker volume is occupied by the back-side cavity. To accommodate the micro-speaker with back-side cavity, a device design may either increase chassis length (e.g., y-dimension) or chassis thickness (e.g., z-dimension).

FIG. 1B illustrates a frequency response 120 typical of a mobile computing device employing the micro-speaker design illustrated in FIG. 1A. Sensitivity at a distance from the source of 10 cm is shown for a 2V. (500 mW) drive signal. Frequency response 120 has a peak at a resonance frequency of around 1 kHz associated with the back-side cavity, and another peak at a resonance frequency of around 4-5 kHz associated with front-side acoustics. While sound pressure is significant at the micro-speaker resonance frequencies, perceived loudness rolls off rapidly within a few hundred Hertz on either side of the resonance frequencies for a narrow band output perceived by the human auditory system as "thin" sounding. Such a perception impedes a user's enjoyment of hands-free calls, audio/video (A/V) playback, and gaming.

To facilitate a continued shrinking of mobile device platform dimensions, loudspeaker performance may continue to decline until loudspeaker integration is discontinued, at which point device users will be required to rely exclusively on ear buds, or other auxiliary audio speakers. Loudspeaker solutions that can augment existing micro-speaker designs to achieve greater audio performance, or replace existing micro-speaker designs to enable more flexibility in device form factor and scalability are therefore advantageous.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1A:
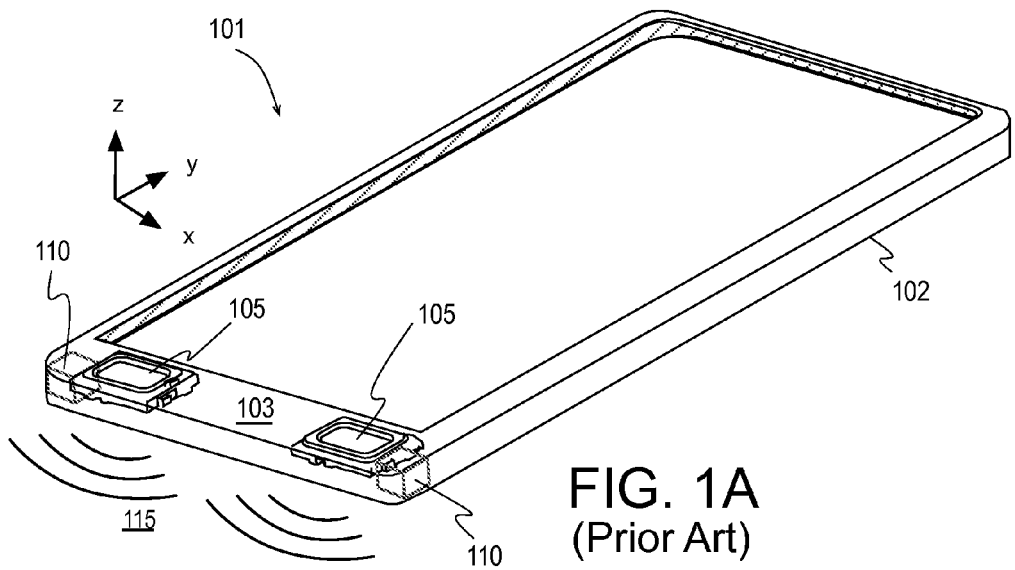
FIG. 1A illustrates a mobile computing device assembly with a conventional micro-speaker design.
Figure 1B:
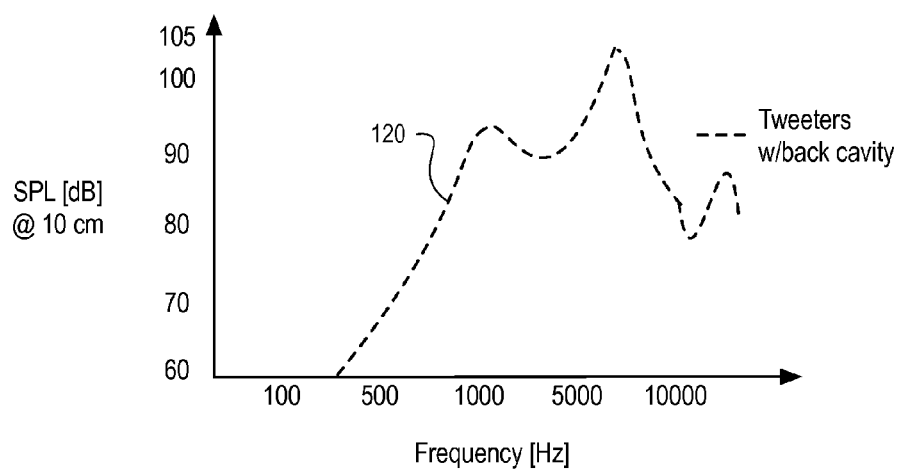
FIG. 1B illustrates frequency response typical of a mobile computing device employing a conventional micro-speaker design.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and in the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures, such system-on-a-chip (SoC) architectures for example, implementation of the techniques and/or arrangements described herein are not restricted to particular architectures and/or computing systems, and m fay be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein may be implemented in hardware, for example as logic circuitry in an image processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media is described below for enhancing loudspeaker audio performance in thin/small form factor devices, such as mobile computing and communication handsets. In some embodiments, a laminate panel including a dielectric membrane and one or more conductive traces patterned into inductive loops suitable for wireless charging and/or near field communication (NFC) is employed as a loudspeaker panel driven at audio frequencies. In some embodiments, the laminate panel is driven with one or more piezoelectric element. In some embodiments, the laminate panel is of a stiffness and mass tuned to provide a bass frequency response distinct from a mid-range or treble frequency response of integrated micro-speakers. A 2.1 audio solution may be provided with wider acoustic output bandwidth than is possible with only resonance-tuned micro-speakers. In some embodiments, the frequency spectrum spanned by the laminate panel loudspeaker enables a micro-speaker design lacking back-side cavities for smaller device form factor. In some ultra-small form factors, micro-speakers may be eliminated in reliance upon the laminate panel as the only loudspeaker diaphragm for the computing platform.

Figure 2A:
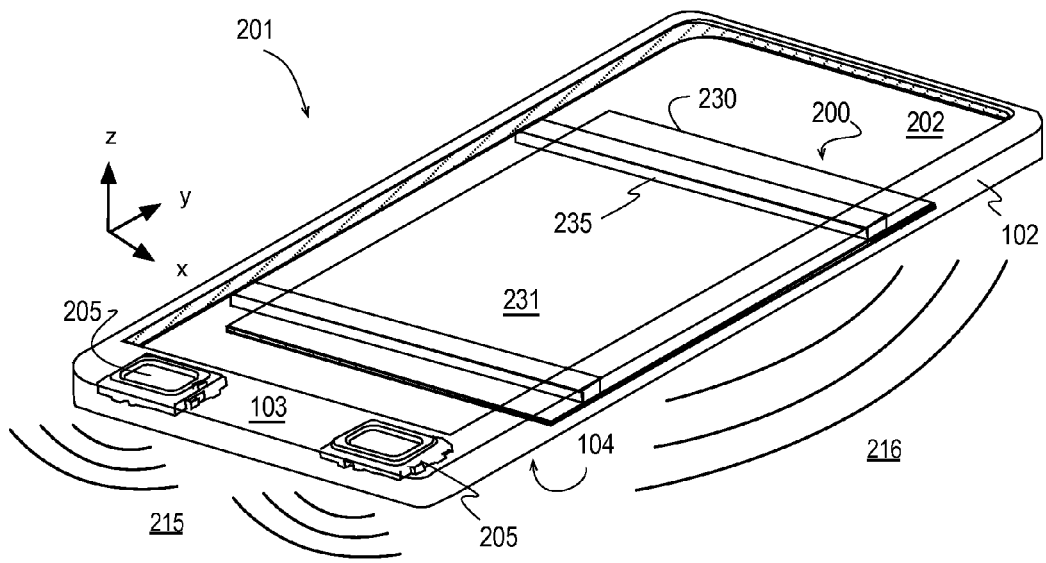
FIG. 2A illustrates a mobile computing device assembly including components of a 2.1 audio system, in accordance with some embodiments.

FIG. 2A illustrates a mobile computing device assembly 201 including components of a 2.1 audio system, in accordance with some embodiments. Assembly 201 includes a device chassis 102 forming a frame encircling an inner cavity 202 within which internal device components reside.

Chassis 102 has a front-side 103 and a back-side 104. For the sake of clarity, assembly 201 is illustrated without a front-side display screen (e.g., liquid crystal display) and/or cover glass, as well as without a back-side cover, enclosing various internal device components also not depicted. In some exemplary embodiments, mobile computing device assembly 201 is a partial assembly of mobile communication handset, or smartphone.

The exemplary 2.1 audio system depicted includes a pair of integrated micro-tweeters 205, and an integrated loudspeaker including a laminate vibration panel 200. Laminate panel 200 includes a dielectric membrane 230 and is of a stiffness and mass tuned to provide a bass frequency response distinct from a mid-range or treble frequency response of micro-tweeters 205. In other words, laminate panel 200 functions as a bass speaker or subwoofer in the 2.1 system. While micro-tweeters 205 may be of any conventional design, in some advantageous embodiments, micro-tweeters 205 lack a back-side cavity. As such, there is no acoustically sealed chamber or cavity on a back-side of the micro-speaker loudspeaker membrane. Absent any acoustically sealed back-side cavity, the total platform volume occupied by micro-tweeters 205 is significantly less than that of a micro-speaker of comparable membrane area employing such a cavity. In absence of the back-side cavity, micro-speaker sound pressures are reinforced over at least a portion of acoustic output bandwidth by acoustic output from laminate panel 200.

As further illustrated in FIG. 2A, dielectric membrane 230 has a back-side surface 231 mechanically coupled to a speaker actuator disposed within the cavity defined by chassis 102. The actuator is to generate an acoustic output by displacing membrane 230 relative to chassis 102 in response to an electrical signal. During operation, vibrations in laminate panel 200 generate acoustic energy 216 within the audible frequency range. In some embodiments, acoustic energy 215 is emanated predominately from a front-side of laminate panel 200, opposite the speaker actuator, and facing away from chassis back-side 104. In the illustrated embodiment, the speaker actuator comprises a pair of piezoelectric elements 235. In other embodiments, more than two piezoelectric elements 235, or a single piezoelectric element 235, may be employed as the speaker actuator. In the illustrated embodiment, the pair of piezoelectric elements 235 are disposed at opposite ends of laminate panel 200. In exemplary embodiments, the piezoelectric elements are distributed mode actuators in which a bending motion generates distributed acoustic output from laminate panel 200. When more than one piezoelectric elements 235 is employed, they may generate vibrations in laminate panel 200 associated with a same or different frequency responses. In alternative embodiments, the speaker actuator comprises any electromagnetic actuator known to be suitable for an acoustic vibration panel application. In still other embodiments, the speaker actuator comprises a voice coil motor.

In some exemplary embodiments, loudspeaker laminate panel 200 has a surface area significantly larger than that of a diaphragm employed in micro-tweeters 205. In some embodiments, laminate panel 200 has an acoustically active surface area (i.e., the portion of panel 200 that is to bend or vibrate relative to chassis 102 during operation) that is at least three times the diaphragm area of one micro-tweeter 205. Advantageously, laminate panel 200 has an acoustically active surface area that is at least five times that of one micro-tweeter 205, and more advantageously at least an order of magnitude larger than the diaphragm area of one micro-tweeter 205. In some exemplary embodiments, laminate panel 200 has an acoustically active surface area that is at least 9 cm$^2$, advantageously at least 12 cm$^2$, and more advantageously at least 16 cm$^2$. In exemplary embodiments, laminate panel 200 is of a significantly different surface area than that of a display screen (e.g., LCD panel) disposed over chassis front-side 130, opposite laminate panel 200.

Figure 2B:
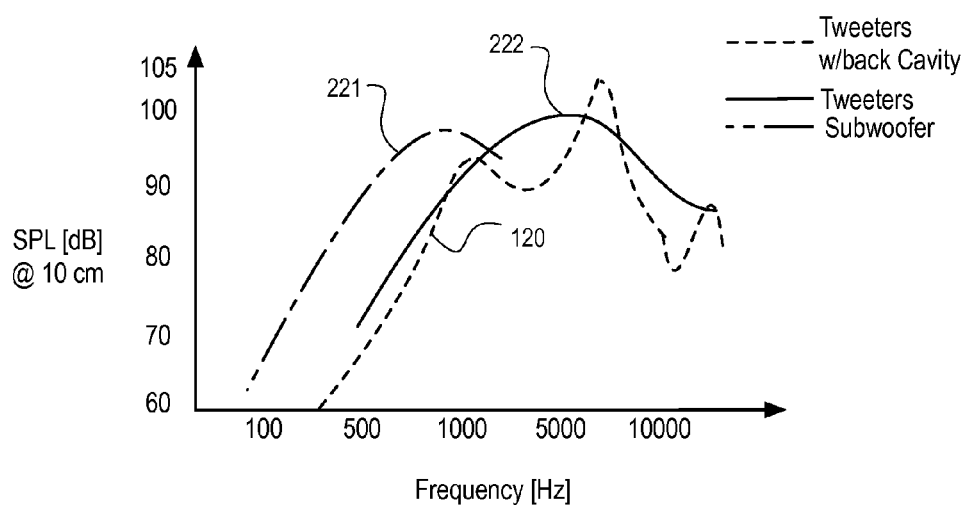
FIG. 2B illustrates frequency response of a mobile computing device employing a 2.1 audio system, in accordance with some embodiments.

In the exemplary 2.1 mobile audio system, micro-tweeters 205 have a resonance frequency no lower than 1 KHz, advantageously above 1 KHz, and more advantageously 2 KHz, or above. The loudspeaker employing laminate panel 200 has a resonance frequency below 1 KHz, advantageously below 750 Hz, and more advantageously below 500 Hz. FIG. 2B illustrates a frequency response for a mobile computing device employing a 2.1 audio system, in accordance with some embodiments. A model loudspeaker employing laminate panel 200 generates acoustical output having an estimated subwoofer frequency response 221 reaching a sound pressure level (SPL) of at least 50 dB, and advantageously 70 dB at 100 Hz at a 10 cm distance from the source. Model micro-tweeters 205 lacking a back-side cavity generate acoustical output having a mid-range and/or treble frequency response 222 reaching a sound pressure level (SPL) of at least 80 dB at 5000 Hz at 10 cm distance from the source. While micro-tweeters 205 may be driven by a 2 $V_{rms}$ drive signal, a higher voltage (e.g., 30 $V_{pk-pk}$) may be needed to drive laminate panel 200, as a function of the actuator. The frequency response 120 associated with a conventional 2.0 audio system including only a pair of micro-speakers with sealed back-side cavities is further included in FIG. 2B to illustrate the greater acoustic output bandwidth of a 2.1 audio system in accordance with embodiments described herein.

Any known dielectric material may be employed as the dielectric membrane of a laminate panel loudspeaker in accordance with embodiments herein. Functioning as a loudspeaker diaphragm, properties of the dielectric membrane are important for tuning the acoustical performance of the laminate panel. The dielectric membrane material and film properties affect directly the panel loudspeaker sensitivity (loudness) and bandwidth (frequency response). Membrane stiffness (flexibility), mass, and elastic modulus, are all important for selecting the material. One exemplary dielectric membrane material is a polyimide film. The use of a dielectric membrane material as the loudspeaker diaphragm advantageously enables the membrane to be further employed as a substrate for one or more conductive traces. The conductive traces together with the dielectric membrane are the minimum constituents of a loudspeaker laminate panel in accordance with some embodiments. Conductive traces disposed on the dielectric membrane may form one or more inductive loop or coil operable for at least one of inductive charging of the mobile device platform, or near field communication (NFC) with the mobile device platform. Laminate panel 200 therefore integrates inductive coupling functions with acoustic output functions in a mobile computing platform.

Figure 3A:
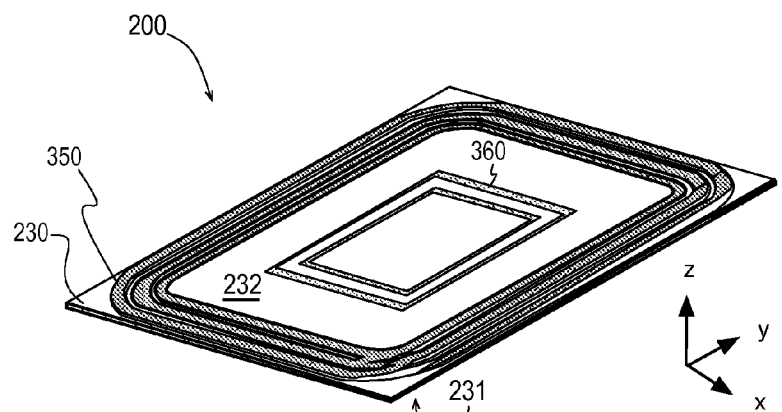
FIG. 3A illustrates a laminate panel including an inductive coil, in accordance with some embodiments.

FIG. 3A further depicts laminate panel 200 to include an inductive charging coil 350 disposed on dielectric membrane 230, in accordance with some embodiments. Inductive charging coil 350 comprises one or more inductive loops of conductive trace disposed on the front-side 232 of dielectric membrane 230. Conductive traces may be of any metal or other conductive material known to be suitable for the purpose of inductive device charging. In some exemplary embodiments, laminate panel 200 includes one or more copper traces forming one or more concentric or coiled loops disposed on a polyimide film. In some further embodiments, the inductive loops 350 and/or 360 each has an inductance of at least 1 H. In some embodiments, both an inductive charging coil and a NFC coil are disposed (e.g., printed) on a dielectric membrane. As further illustrated in FIG. 3A, an NFC coil 360 includes one or more conductive traces forming one or more first inductive loops disposed within an inner region of dielectric membrane 230 while inductive charging coil 350 includes one or more conductive traces forming one or more second inductive loops disposed within an outer region of dielectric membrane 230.

Integrating a loudspeaker with inductive coils of a wireless charging or NFC element within a mobile device has a number of advantages. Relative to other more complex paneled components of a mobile device (e.g., a display screen), inductive charging and/or NFC coils are more tolerant of bending and vibrations. Also, because inductive coils are often separated from a back cover of a mobile device (e.g., to allow the use of a metal cover for minimum device thickness), a dielectric membrane is suitable as an alternative substrate for implementing the inductive charging coils. Furthermore, because the inductive coils are of very low mass and indifferent to the substrate beyond it being a dielectric, one is free to tune the dielectric membrane mass and stiffness to achieve a desired acoustic output performance as a loudspeaker. In some embodiments where the acoustically active membrane surface area is at least 9 cm$^2$ for example, laminate panel 200 (e.g., comprising coil 350 and/or 360) has a total mass no greater than 50 g. This low mass provides a large window for tuning the laminate panel stiffness to achieve a desired frequency response for the loudspeaker. Inductive coils are also forgiving with respect to trace routing, enabling the routing to be optimized from a standpoint of tuning bending modes within the laminate panel.

Figure 3B:
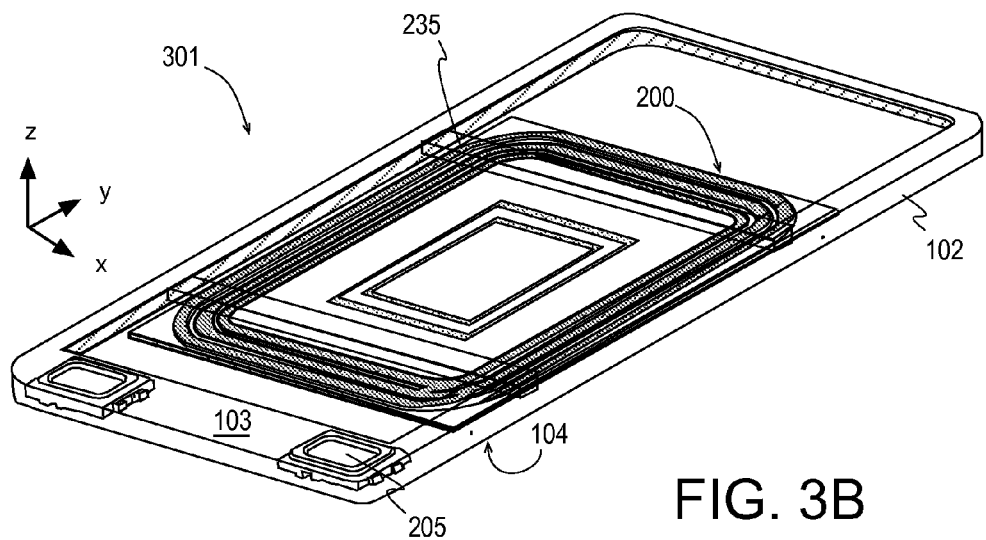
FIG. 3B illustrates a mobile computing device assembly employing a 2.1 audio system with a loudspeaker including a laminate panel coupled to piezoelectric elements, in accordance with some embodiments.

Inductive coils may be printed on one or more sides of a dielectric membrane. In the exemplary embodiment illustrated in FIG. 2A and FIG. 3A, inductive coils 350, 360 are printed on membrane front-side 232. At least one inductive coil may also be disposed on the membrane back-side 231. FIG. 3B illustrates a mobile computing device assembly 301 with a 2.1 audio system that includes a loudspeaker comprising laminate membrane 200 coupled to piezoelectric elements 235, in accordance with some embodiments. FIG. 3B illustrates first embodiments where inductive coils are disposed on a front-side of dielectric membrane 230 (with membrane 230 shown as being optically transparent) to be on an opposite side as piezoelectric elements 235. FIG. 3B also illustrates second embodiments where inductive coils are disposed on the membrane back-side to face piezoelectric elements 235.

Figure 3C:
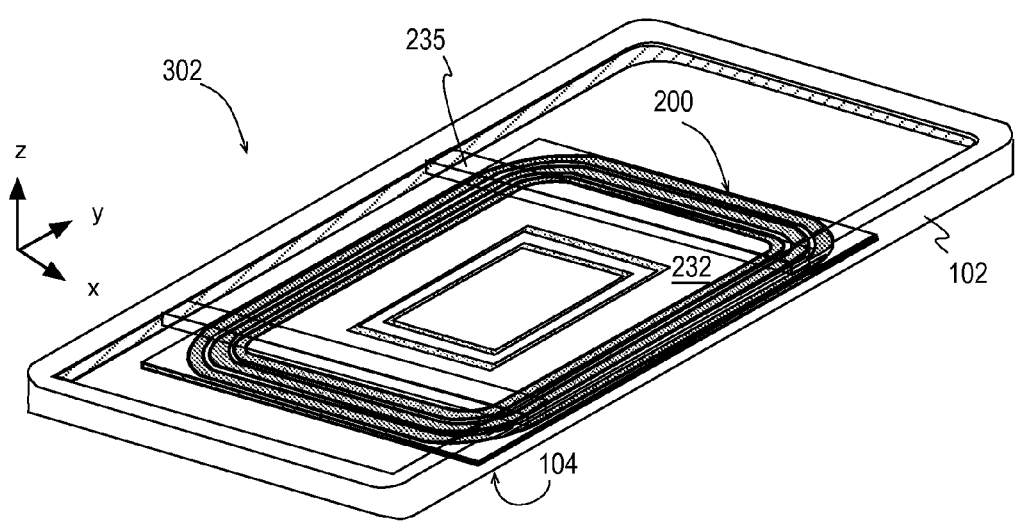
FIG. 3C illustrates a mobile computing device assembly having an ultra-small form factor with a single loudspeaker including a laminate panel coupled to piezoelectric elements, in accordance with some embodiments.

Although for the exemplary 2.1 audio system, the loudspeaker laminate panel is to be tuned for low frequencies (e.g., as a subwoofer) as a complement to micro-tweeters 205 for wideband audio performance, the loudspeaker laminate panel may also be employed as the exclusive source of acoustic output in a mobile computing device. FIG. 3C illustrates a mobile computing device assembly 302 having an ultra-small form factor including laminate panel 200 coupled to piezoelectric elements 235, in accordance with some embodiments. Additional form factor size reduction is achieved by eliminating micro-speakers from the platform in exclusive reliance on one loudspeaker that employs the laminate panel. Frequency response of such a loudspeaker depends in part on the platform dimension, impacting laminate panel dimensions. For example, for a wearable mobile computing device (e.g., a wrist watch) laminate panel 200 may only be a 2-3 cm on a side. Stiffness of such a panel may be nevertheless tuned to achieve a wide range of frequency response.

Figure 4A:
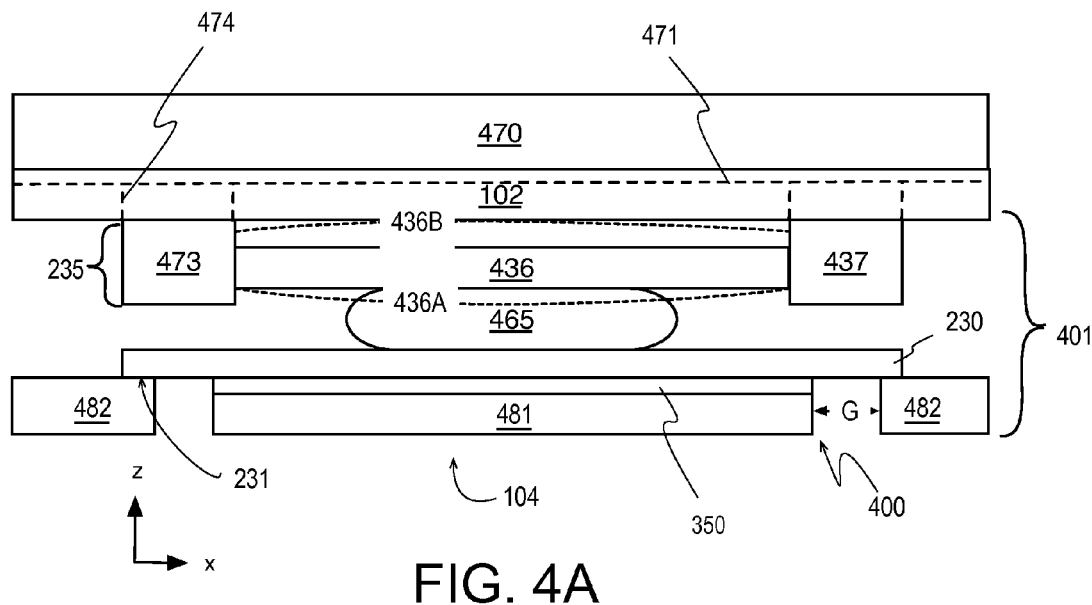
FIG. 4A illustrates a cross-sectional view of a loudspeaker including a laminate panel coupled to piezoelectric elements, in accordance with some embodiments.

FIG. 4A illustrates a cross-sectional view of a loudspeaker 401 including a laminate panel 400 coupled to piezoelectric elements 235 and mounted to a device chassis 102, in accordance with some embodiments. As shown, a display panel glass 470 is disposed over a front-side of chassis 102. Display panel glass 470 may be embedded within a cavity encircled by chassis 102, as represented by dashed line 471. Disposed within chassis 102 opposite display panel glass is a piezoelectric element 235. Piezoelectric element 235 includes a deflectable bar member 436, which is to deflect, bend, or otherwise deform between positions 436A and 436B in response to an input electrical drive signal. Deflectable bar member 436 includes one or more regions physically anchored to chassis 102 by anchor 473. In some embodiments, as illustrated by dashed lines 474, anchors 473 are embedded within a cavity encircled by chassis 102. Anchor 473 may be in direct contact with chassis 102. Alternatively, anchor 473 may be physically coupled through another component disposed within the chassis cavity, such as but not limited to, a battery, a printed circuit board (PCB), or display panel glass 470. In some embodiments, a battery (not depicted) is disposed within a cavity between display panel glass 470 and the dielectric membrane 230. The battery is electrically coupled to the display, a processor, the piezoelectric elements 235 (or alternate speaker actuator), and inductive charging coils of the laminate panel.

Deflectable bar member 436 further includes one or more region physically coupled to a laminate panel 400. In the exemplary embodiment, an interior region of dielectric membrane 230 is physically attached to deflectable bar member 436 with a coupling member 465. In some advantageous embodiments coupling member 465 is an elastomeric material, such as, but not limited to, silicon adhesives. Coupling member 465 is to form a resilient joint between deflectable bar member 436 and relatively stiff laminate panel 400.

A second side of a laminate panel opposite the speaker actuator is affixed to the chassis, or to an intervening member that is physically coupled to the chassis. This second side is to form an acoustic and/or hermetic seal. In the exemplary embodiment illustrated in FIG. 4A, laminate panel 400 includes inductive loop trace 350 disposed within an inner region of membrane 230 while an outer region surrounding the inner region of back-side membrane surface 231 is affixed to an inside surface of back-side frame or bezel 482. Back-side frame 482 forms a perimeter about laminate panel 400. Although not illustrated in FIG. 4A, back-side frame 482 is coupled to chassis 102 so as to remain in a fixed position relative to chassis 102 even during operation of loudspeaker 401. In some embodiments, a perimeter of membrane 230 is affixed to back-side frame 482 by a continuous adhesive seal, comprising for example, a silicon-based adhesive.

In some embodiments, a loudspeaker laminate panel includes one or more mechanical stiffening members. Mechanical stiffening members, "stiffeners," may be disposed on an interior or exterior side of the laminate panel, or both. Stiffening members may comprise any non-metallic material known to be suitable as a covering for inductive loops 350, such as, but not limited to plastics (e.g., acrylics, polyesters, polyethylene, etc.), carbon fiber, bis-maleimide triazine (BT) laminate, FR-4 glass epoxy, and the like. Other dielectric materials may also be employed. In the example illustrated in FIG. 4A, laminate panel 400 further includes a stiffening member 481. Stiffening member 481 is to function as a mechanical stiffener of the loudspeaker diaphragm and also protect inductive loops 350 from mechanical abrasion and function as a portion of the device back-side cover. In the exemplary embodiment, dielectric membrane 230 suspends stiffening member 481 from chassis 102 (via back-side frame 482). Dielectric membrane 230 therefore seals the interior platform cavity within a gap G between and edge of the stiffening member 481 and an opposing edge of the back-side frame 482. In alternative embodiments, stiffening member 481 has the same area as dielectric membrane 230 and an exterior edge surface of stiffening member 481 is sealed to an interior edge surface of back-side frame 482 substantially as illustrated for membrane 230. In still other embodiments, dielectric membrane 230 is the outermost surface (i.e., the back-side cover) while stiffening member 481 is disposed within device cavity encircled by chassis 102. Inductive loops 350 may be disposed between stiffening member 481 and membrane 230, or disposed on a side of stiffening member 481 opposite membrane 230. For such embodiments, dielectric membrane 230 may from a continuous skin on the outside of the computing device.

Figure 4B:
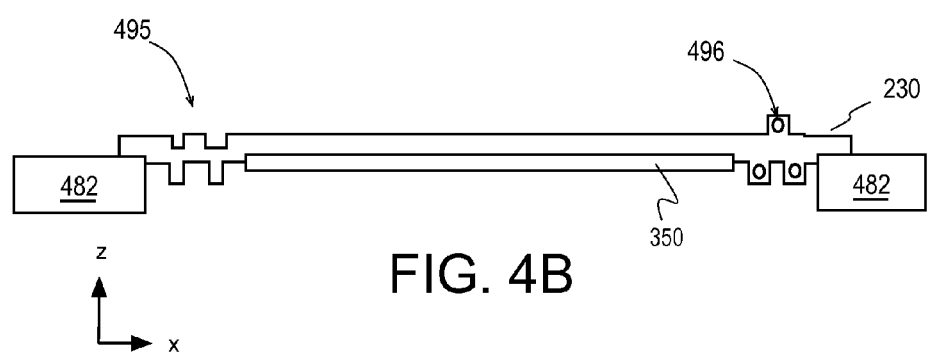
FIG. 4B illustrates a cross-sectional view of a dielectric membrane including stiffening features, in accordance with some embodiments.

FIG. 4B illustrates a cross-sectional view of a dielectric membrane 230 including stiffening features 495, 496, in accordance with some embodiments. Stiffening features 495 comprise corrugations, for example stamped or injection molded into membrane 230. Stiffening features 496 comprise reinforcement filaments of a distinct material embedded within, or laminated to, dielectric membrane 230. Although illustrated as extending in the y-dimension, stiffening features 495, 496 may extend in either or both x-y dimension, and have radial or rectangular symmetry. A membrane with stiffening features may be incorporated into a laminate panel further comprising both inductive loop traces and a back-side cover or other stiffening member.

In the embodiment illustrated in FIG. 4A, laminate panel 400 is an external surface of a mobile computing device platform back-side 104. One might expect that when laminate panel 400 is externally visible and can make physical contact with user or other external objects, laminate panel 400 might not function well as a loudspeaker. For example laminate panel 400 might be expected to be heavily damped when the platform is held in a user's hand or placed on a surface. However, the inventor has found that when driven to vibrate in audible frequencies, a stiff membrane need only have a travel length of 0.02-0.1 mm. It has further been determined that sound sensitivity of the laminate panel is not significantly attenuated by a user's touch with fingers or palm, or when the panel is placed against a table or in pocket.

Figure 5:
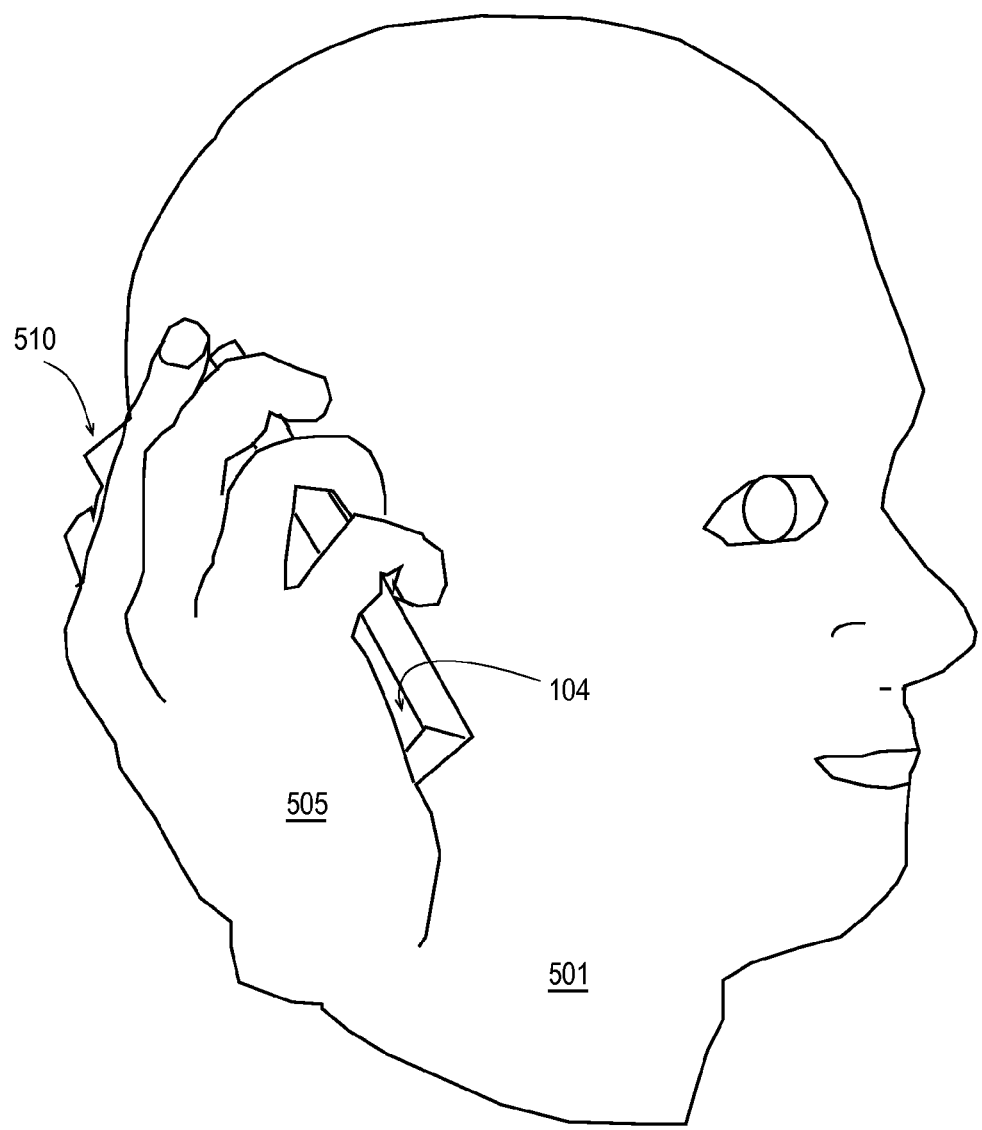
FIG. 5 illustrates an orientation of a loudspeaker including a laminate panel during operation of a mobile computing device, in accordance with some embodiments.

FIG. 5 illustrates an orientation of a loudspeaker including a laminate panel during operation of a mobile computing device, in accordance with some mobile handset embodiments. As shown, a laminate panel loudspeaker may be employed even when not in a hands-free mode. In the illustrated embodiment, user 501 holds mobile handset platform 510 in hand 505 with a back-side surface 104 against the palm and a front-side (i.e., display-side) against the ear. In this orientation, the loudspeaker laminate panel faces the user's palm. In some embodiments, rather than employing a conventional front-side earpiece, the loudspeaker panel is driven with very low gain. User 501 can hear a normal phone call (receiver) on any front-side location of handset platform 510 (e.g., anywhere on display glass), or any back-side location. There is then no need for the user to specifically position their ear to an earpiece. Privacy may be maintained where the sensitivity of the speaker in phone call mode is sufficiently small that one cannot hear the acoustic output without placing handset platform 510 against the ear, forming a seal against the display glass.

Figure 6:
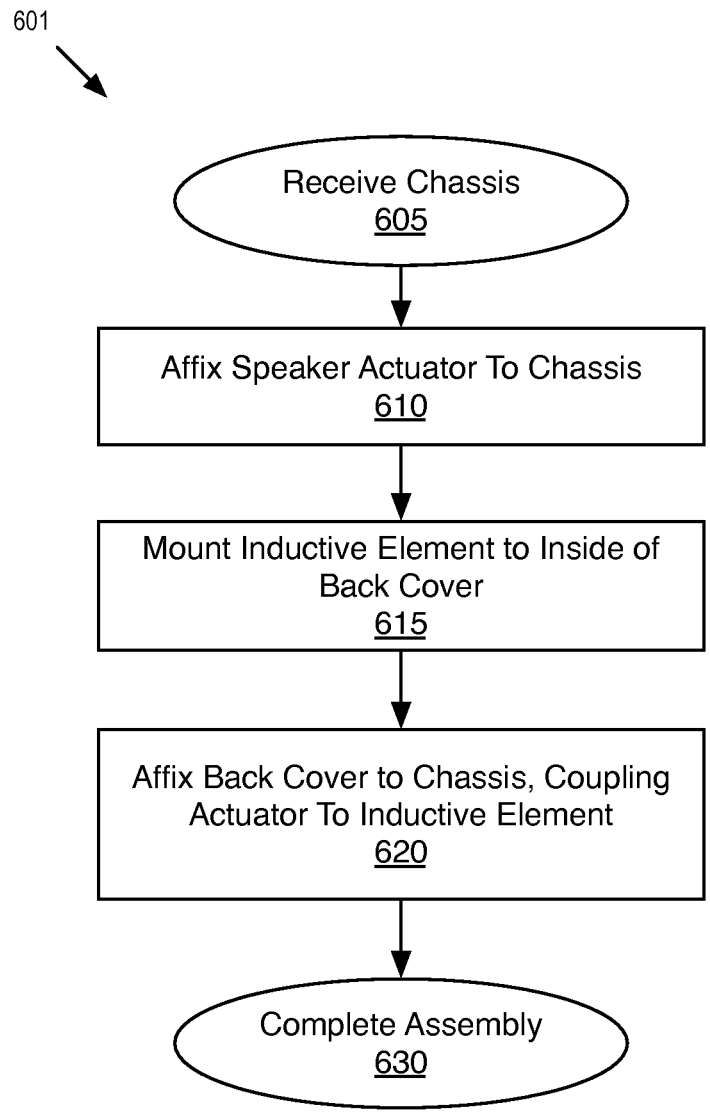
FIG. 6 is a flow diagram illustrating a method of assembling a mobile computing device assembly including a loudspeaker with a laminate panel, in accordance with some embodiments.

FIG. 6 is a flow diagram illustrating a method 601 for assembling a mobile computing device assembly including a loudspeaker with a laminate panel, in accordance with some embodiments. Method 601 begins with receiving a chassis at operation 605. The chassis may be of any chassis design suitable for housing the loudspeaker components. One or more components, such as display panel, PCB, microprocessor, etc. may be installed within the chassis as received at operation 605. At operation 610, a speaker actuator is affixed to the chassis, either directly or to another component disposed within the chassis. At operation 615, a laminate panel including a dielectric membrane and an inductive charging coil or NFC coil is mounted to an inside surface of a back-side cover (e.g., back-side frame). At operation 620, the back-side cover is affixed to the chassis, bringing a front-side surface of laminate panel in contact with a mounting surface of the speaker actuator (e.g., contacting the dielectric membrane with elastomeric adhesive material disposed on a deflectable member of a piezoelectric element). At operation 630, the device assembly is completed using any conventional techniques.

Figure 7:
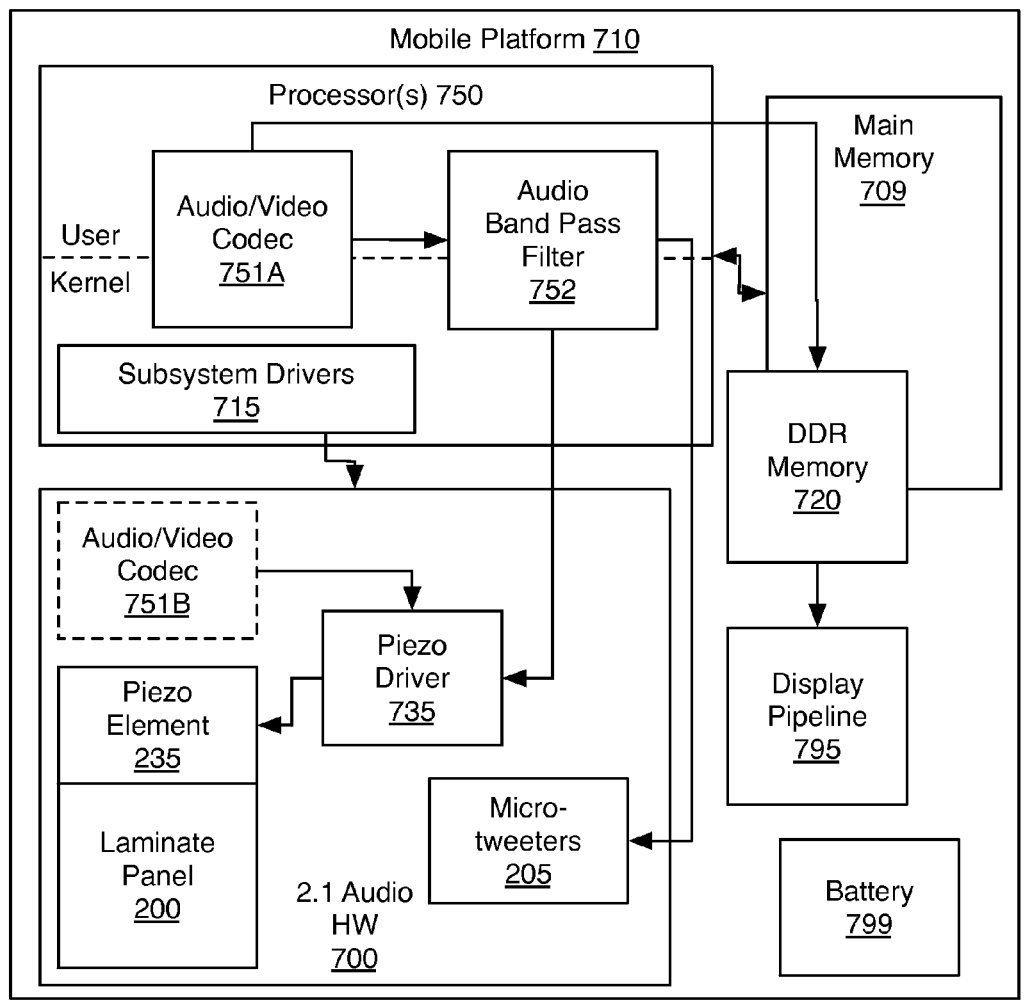
FIG. 7 illustrates a schematic of a mobile handset platform including a loudspeaker with a laminate panel coupled to piezoelectric elements, in accordance with some embodiments.

FIG. 7 illustrates a block diagram of mobile computing platform 710 including a loudspeaker with a laminate panel coupled to piezoelectric elements, in accordance with some embodiments. FIG. 7 further illustrates how laminate panel loudspeaker may be integrated with various other components of mobile computing platform 710 to provide enhanced audio output. Mobile computing platform 710 may be any device having a processing system and a mobile power source or supply, such as one or more batteries, for example. Examples of a mobile computing device may include a laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth. Examples of a mobile computing device also include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Platform 710 includes 2.1 audio system 700. System 700 includes laminate panel 200, piezoelectric element 235 physically coupled to laminate panel 200, and piezoelectric driver 735 electrically coupled to piezoelectric element 235. The 2.1 audio system 700 further includes a pair of micro-tweeters 205. Piezoelectric driver 735 is to provide a high voltage (e.g., 30 $V_{pk-pk}$, or more) signal suitable for driving piezoelectric element 235 based on a received low voltage audio signal to generate an acoustic output from laminate panel 200 by displacing the panel relative to a platform chassis. In some embodiments piezoelectric driver 735 comprises a high voltage Class H ceramic speaker driver, such as but not limited to LM48560, commercially available from Texas Instruments, Inc. Piezoelectric driver 735 is coupled to an output of audio/video codec 751A or 751B, as well as to battery 799. In some embodiments, battery 799 is further coupled to one or more inductive coil of laminate panel 200. Codec 751A or 751B includes logic to decompress or decode a digital audio stream into an audio signal. In some embodiments, codec 751A is implemented by microprocessor 750. In alternative embodiments, codec 721B is implemented by audio HW 700 comprising integrated circuitry external to microprocessor 750. In some embodiments, processor(s) 750 includes logic to perform A/V codec operations on an input digital audio stream and output an audio signal suitable for piezoelectric driver 735. In some embodiments, A/V codec logic 751A is implemented with programmable circuitry including registers that have been configured through software instruction(s). Both software and hardware implementations may be well suited to implementing A/V codec logic 751A in accordance with embodiments described herein. For hardware implementations, A/V codec logic 751B may be implemented by fixed function logic. For software implementations, any known programmable processor, including a core of processor(s) 750, an execution unit of a graphics processor, or vector processor, may be utilized to implement the A/V codec logic 751A or 751B.

In some embodiments, an output of the audio codec (e.g., codec 751A) is coupled to an input of both piezoelectric driver 735 and micro-tweeters 205 through an audio band pass filter 752. Audio band pass filter 752 may pass a lower frequency band to piezoelectric driver 735 and pass a higher frequency band to micro-tweeters 205. One or more subsystem drivers 715 may be employed to control parameters of 2.1 audio system 300, including operation of piezoelectric driver 735, for example to reduce an output sensitivity of laminate panel 200. In some embodiments, processor(s) 750 is programmed with instructions stored on a computer readable media to cause the processor to perform one or more driving a speaker actuator coupled to a laminate panel 200, for example as described elsewhere herein.

Battery 799 is electrically coupled to an inductive coil comprising an element of laminate panel 200. During a battery-charging phase of operation, the inductive coil is to inductively charge battery 799 from an alternating current power source external to platform 710. One or more processor 750 is further electrically coupled to battery 799.

As further illustrated in FIG. 7, video output from A/V codec 751 may be output to storage/display/transmission pipeline 795. In one exemplary storage pipeline embodiment, video data is streamed to electronic memory 720 (e.g., DDR, etc.). Memory 720 may be separate or a part of a main memory 709 accessible to processor 750. Alternatively, or in addition, storage/display/transmission pipeline 795 is to output a visual representation of video data in synchronization with acoustic output generated by laminate panel 200 in response to a drive signal generated based on audio data associated with the video data.

Figure 8:
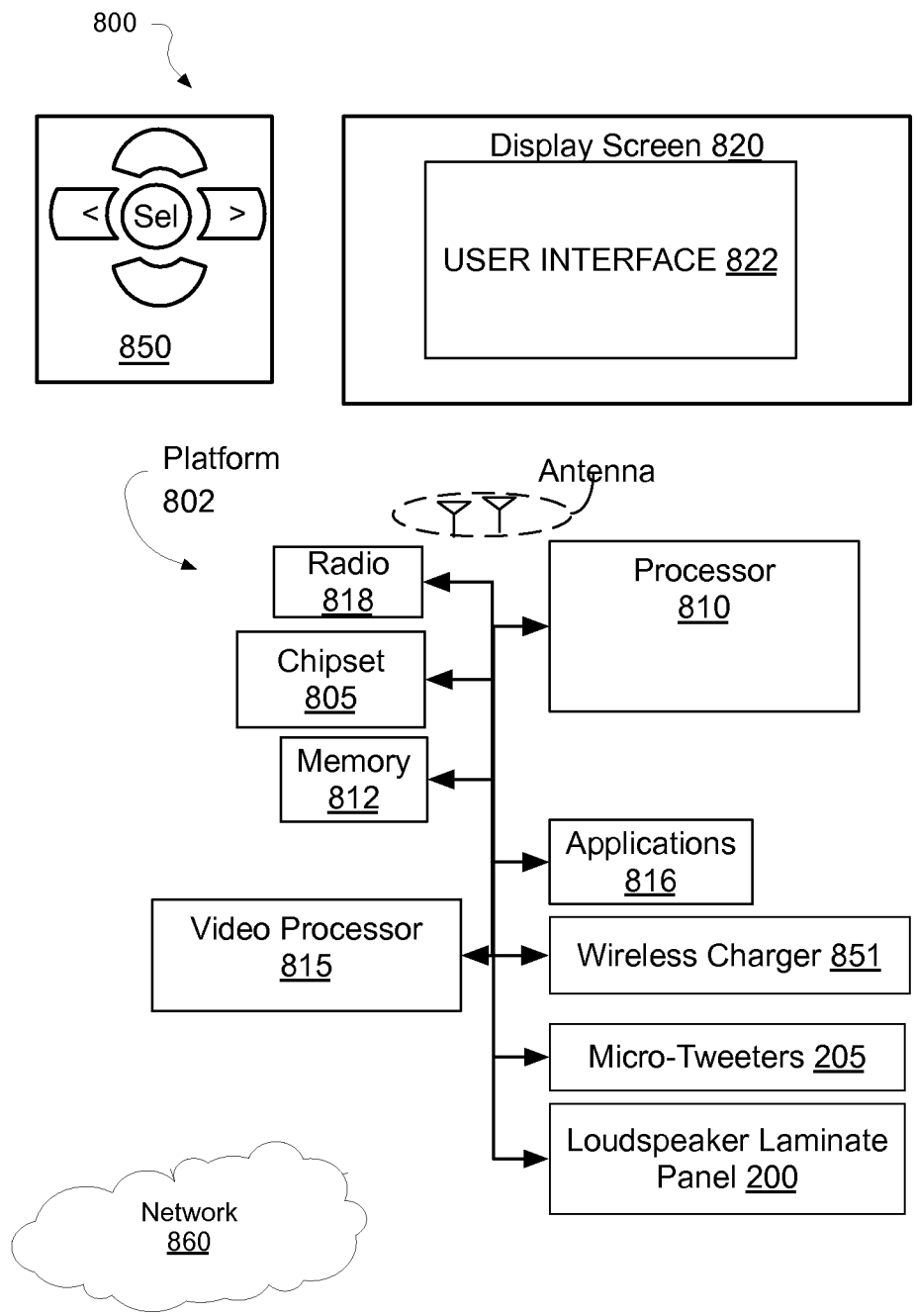
FIG. 8 is a diagram of an exemplary ultra-low power system employing a loudspeaker including a laminate panel, in accordance with some embodiments.

FIG. 8 is a diagram of an exemplary ultra-low power system 800 employing loudspeaker laminate panel, in accordance with one or more embodiment. System 800 may be a mobile device although system 800 is not limited to this context. System 800 may be incorporated into a wearable computing device, laptop computer, tablet, touch pad, handheld computer, palmtop computer, cellular telephone, smart device (e.g., smart phone, smart tablet or mobile television), mobile internet device (MID), messaging device, data communication device, and so forth. System 800 may also be an infrastructure device. For example, system 800 may be incorporated into a large format television, set-top box, desktop computer, or other home or commercial network device.

System 800 includes a device platform 802 that may implement all or a subset of the various acoustic output generation methods and any of the logic blocks/circuitry described above in the context of FIG. 2A-FIG. 7. In various exemplary embodiments, video processor 815 executes at least a portion of A/V codec logic, for example as described above. In some embodiments, one or more computer readable media may store instructions, which when executed by CPU 810 and/or video processor 815, cause the processor(s) to drive a laminate panel to generate acoustic output.

In embodiments, device platform 802 is coupled to a human interface device (HID) 820. Platform 802 may wirelessly charge a battery configured to power platform 802 with a wireless charger 851 further including one or more wireless charging coils. Platform 802 includes at least a loudspeaker laminate panel 200, and further includes micro-tweeters 205 implementing a mobile 2.1 audio system. A navigation controller 850 including one or more navigation features may be used to interact with, for example, device platform 802 and/or HID 820. In embodiments, HID 820 may include any television type monitor or display panel coupled to platform 802 via radio 818, and/or network 860, and/or be integrated into platform 802. HID 820 may include, for example, a computer display screen, touch screen display, video monitor, television-like device, and/or a television to receive touch inputs.

In embodiments, device platform 802 may include any combination of wireless charger 350, micro-tweeters 205, loudspeaker laminate panel 200, chipset 805, processors 810, 815, memory/storage 812, applications 816, and/or radio 818. Chipset 805 may provide intercommunication among processors 810, 815, memory 812, video processor 815, applications 816, or radio 818.

One or more of processors 810, 815 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 812 may be implemented as a volatile memory device such as, but not limited to, a Random Access Memory (RAM), Dynamic Random Access Memory (DRAM), or Static RAM (SRAM). Memory 812 may also be implemented as a non-volatile storage device such as, but not limited to flash memory, battery backed-up SDRAM (synchronous DRAM), magnetic memory, phase change memory, and the like.

Radio 818 may include one or more radios capable of transmitting and receiving signals using various suitable wireless communications techniques. Such techniques may involve communications across one or more wireless networks. Example wireless networks include (but are not limited to) wireless local area networks (WLA/Vs), wireless personal area networks (WPA/Vs), wireless metropolitan area network (WMA/Vs), cellular networks, and satellite networks. In communicating across such networks, radio 618 may operate in accordance with one or more applicable standards in any version.

In embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Figure 9:
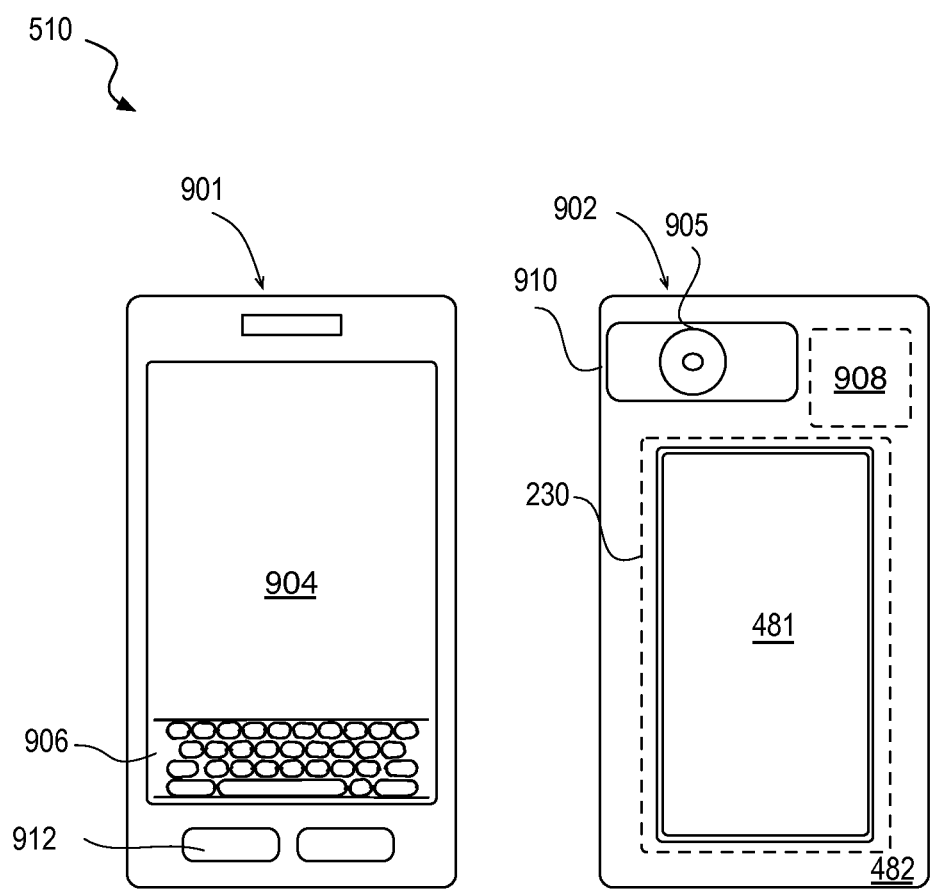
FIG. 9 is a diagram of an exemplary mobile handset platform, arranged in accordance with some embodiments.

As described above, system 800 may be embodied in varying physical styles or form factors. FIG. 9 further illustrates embodiments of a mobile handset platform 510 in which platform 710 and/or system 800 may be embodied. In embodiments, for example, handset platform 510 may be implemented as a mobile computing device having wireless telecommunication capabilities. As shown in FIG. 9, mobile handset platform 510 may include a housing with a front-side 901 and back-side 902. Handset platform 510 includes a display 904, an input/output (I/O) device 906, and an integrated antenna 908. Handset platform 510 also may include navigation features 912. Display 904 may include any suitable display panel for displaying information appropriate for a mobile computing device. I/O device 906 may include any suitable I/O device for entering information into a mobile computing device. Examples for I/O device 906 include an alphanumeric keyboard, a numeric keypad, a touch pad, input keys, buttons, switches, microphones, speakers, voice recognition device and software, and so forth. Information also may be entered into handset platform 510 by way of microphone (not shown), or may be digitized by a voice recognition device. Embodiments are not limited in this context. Integrated into at least the front-side 901, or back-side 902, is a camera module 905 (e.g., including a lens, an aperture, and an imaging sensor). As further illustrated, back-side 902 comprises a back-side cover 481 affixed to a back-side frame or bezel 482, for example by a perimeter portion of a dielectric membrane 230 to form a loudspeaker laminate panel.

As exemplified above, embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to be physically transformed into a system falling within the scope of the embodiments described herein. Instructions representing various logic within the processor, which when read by a machine may also cause the machine to fabricate logic and/or platform assemblies adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following paragraphs briefly describe some exemplary embodiments:

In one or more first embodiments, a loudspeaker for a wireless device platform, the loudspeaker comprising a chassis encircling a cavity, and a speaker actuator disposed within the cavity, the actuator coupled to the chassis and to a laminate panel, the actuator to generate an acoustic output by displacing the laminate panel relative to the chassis in response to an electrical signal. The laminate panel further comprises a dielectric membrane, and one or more conductive traces disposed on the dielectric membrane. The conductive traces comprise one or more inductive loop operable for at least one of inductive charging or near field communication.

In furtherance of the first embodiments, an inner region of a first side of the laminate panel is mounted to the speaker actuator, and an outer region surrounding the inner region, of a second side of the laminate panel is affixed to the chassis, or to an intervening member that is physically coupled to the chassis.

In furtherance of the first embodiments immediate above, the actuator comprises one or more piezoelectric elements, each including a deflectable member having a first region coupled to the dielectric membrane through an elastomeric material, and a second region coupled to one or more anchor point affixed to the chassis.

In furtherance of the first embodiments, an area of the dielectric membrane is at least 9 $cm^2$, and the loudspeaker has a resonance frequency below 750 Hz.

In furtherance of the first embodiments, the inner region of the second side is affixed to a mechanical stiffener, the stiffener covering the conductive traces.

In furtherance of the first embodiments immediate above, the dielectric membrane suspends the stiffener from the chassis.

In one or more second embodiments, a mobile computing platform comprises a chassis encircling a cavity, a display disposed on a front-side of the cavity and physically coupled to the chassis, a processor disposed within the cavity and electrically coupled to the display, the processor to decode a digital audio stream into an audio signal, a first loudspeaker disposed in the cavity, the first loudspeaker comprising a speaker actuator coupled to the chassis and to a laminate panel, the actuator to generate a first acoustic output by displacing the laminate panel relative to the chassis based on the audio signal, a battery disposed within the cavity between the display and the laminate panel, the battery electrically coupled to the display, processor, and speaker actuator. The laminate panel further comprises one or more conductive traces disposed on the dielectric membrane, the conductive traces comprising one or more inductive loop operable for at least one of inductive charging or near field communication.

In furtherance of the second embodiments immediate above, the speaker actuator further comprises one or more piezoelectric elements, each including a deflectable member having a first region coupled to the laminate panel, and a second region coupled to one or more anchor point affixed to the chassis. The platform further comprises a loudspeaker driver, the driver coupled to the battery and to the piezoelectric elements, the driver to output to the elements a high voltage electrical signal based on the audio signal.

In furtherance of the second embodiments immediate above, an inner region of a front-side of the dielectric membrane is mounted to the speaker actuator. An outer region surrounding the inner region, of a back-side of the dielectric membrane is affixed to an interior surface of a back-side cover that is physically coupled to the chassis, the membrane forming a continuous seal to the back-side cover that forms a perimeter about the conductive traces.

In furtherance of the second embodiments immediate above, the inner region of the membrane back-side is affixed to a mechanical stiffener, the stiffener covering the conductive traces. The dielectric membrane suspending the stiffener from the back-side cover and the dielectric membrane spanning a gap between and edge of the stiffener and an opposing edge of the back-side cover.

In furtherance of the second embodiments, an area of the dielectric membrane is at least 9 $cm^2$. The dielectric membrane has a mass no greater than 50 g. The first loudspeaker has a resonance frequency below 750 Hz.

In furtherance of the second embodiments, one or more micro-loudspeakers coupled to the processor to receive the audio signal and to generate a second acoustic output, the micro-loudspeakers having a different frequency response than that of the first loudspeaker.

In furtherance of the second embodiments immediately above, the first loudspeaker has a resonance frequency below 750 Hz, and the micro-loudspeakers have a resonance frequency above 1 KHz.

In furtherance of the second embodiments immediately above, the micro-loudspeakers lack an acoustically sealed back-side cavity.

In one or more third embodiments, a method of assembling a mobile computing platform includes receiving a chassis encircling a cavity, affixing a speaker actuator to the chassis, affixing a display to a front-side of the chassis, mounting an inductive element to an interior surface of a back cover, the inductive element including one or more conductive traces disposed on a dielectric membrane, the conductive traces forming one or more inductive loop, physically coupling the speaker driver to the inductive element, and affixing the back cover to the chassis.

In furtherance of the third embodiments, mounting the inductive element further comprises bonding a perimeter of a dielectric membrane to the interior surface, and wherein one or more conductive traces are disposed on the dielectric membrane, the conductive traces comprising one or more inductive loop operable for at least one of inductive charging of the battery or near field communication with the platform.

In furtherance of the third embodiments, the speaker actuator comprises one or more piezoelectric elements, and affixing the back cover to the chassis induces contact between a surface of the dielectric membrane and an elastomeric material bonded to the piezoelectric elements.

In one or more further embodiments, a method of operating a mobile computing platform comprises powering a processor of the platform with a battery disposed in the platform, decoding a digital audio stream into a first audio signal with the processor, generating an acoustic output by displacing a dielectric membrane relative to a chassis of the platform based on the audio signal, and inductively charging the battery from an alternating current power source external to the platform through one or more conductive traces disposed on the dielectric membrane, the conductive traces forming one or more inductive loop.

In furtherance of the fourth embodiments, the method further comprises generating a second acoustic output with one or more micro-speakers coupled to the processor to receive the audio signal, wherein the second acoustic output has a different frequency response than that of the first acoustic output.

In furtherance of the fourth embodiments, displacing the dielectric membrane further comprises outputting to one or more piezoelectric elements a high voltage electrical signal derived from the audio signal.

In one or more fifth embodiments, one or more computer-readable storage media includes instructions stored thereon, which when executed by a processor, cause the processor to perform a method comprising: decoding a digital audio stream into a first audio signal, generating an acoustic output by displacing a dielectric membrane relative to a chassis of the platform based on the audio signal, and inductively charging a battery internal to the platform from an alternating current power source external to the platform through one or more conductive traces disposed on the dielectric membrane, the conductive traces forming one or more inductive loop.

In furtherance of the fifth embodiments, the media further comprising instructions to cause the processor to generate a second acoustic output with one or more micro-speakers coupled to the processor, wherein the second acoustic output has a different frequency response than that of the first acoustic output.

In one or more sixth embodiments, a mobile computing platform, comprises a means to perform any one of the fourth embodiments.

In one or more seventh embodiments, a computer-readable storage media includes instructions stored thereon, which when executed by a processor, cause the processor to perform any one of the fourth embodiments.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A loudspeaker for a wireless device platform, the loudspeaker comprising:
a chassis encircling a cavity; and
a speaker actuator disposed within the cavity, the actuator coupled to the chassis and to a laminate panel, the actuator to generate an acoustic output by displacing the laminate panel relative to the chassis in response to an electrical signal, wherein the laminate panel further comprises:
a dielectric membrane; and
one or more conductive traces disposed on the dielectric membrane, the conductive traces comprising one or more inductive loop operable for at least one of inductive charging or near field communication.

2. The loudspeaker of claim 1, wherein:
a first side of the laminate panel is mounted to the speaker actuator; and
a second side of the laminate panel is affixed to the chassis, or to an intervening member that is physically coupled to the chassis.

3. The loudspeaker of claim 2, wherein the actuator comprises one or more piezoelectric elements, each including a deflectable member having a first region coupled to the dielectric membrane through an elastomeric material, and a second region coupled to one or more anchor point affixed to the chassis.

4. The loudspeaker of claim 1, wherein:
an area of the dielectric membrane is at least 9 $cm^2$; and
the loudspeaker has a resonance frequency below 750 Hz.

5. The loudspeaker of claim 2, wherein the second side of the laminate panel is affixed to a mechanical stiffener, the stiffener covering the conductive traces.

6. The loudspeaker of claim 5, wherein the dielectric membrane suspends the stiffener from the chassis.

7. A mobile computing platform, comprising:
a chassis encircling a cavity;
a display disposed on a front-side of the cavity and physically coupled to the chassis;
a processor disposed within the cavity and electrically coupled to the display, the processor to decode a digital audio stream into an audio signal;
a first loudspeaker disposed in the cavity, the first loudspeaker comprising a speaker actuator coupled to the chassis and to a laminate panel, the actuator to generate a first acoustic output by displacing the laminate panel relative to the chassis based on the audio signal;
a battery disposed within the cavity between the display and the laminate panel, the battery electrically coupled to the display, processor, and speaker actuator, wherein the laminate panel further comprises:
one or more conductive traces disposed on a dielectric membrane, the conductive traces comprising one or more inductive loop operable for at least one of inductive charging of the battery, or near field communication.

8. The mobile computing platform of claim 7, wherein:
the speaker actuator further comprises one or more piezoelectric elements, each including a deflectable member having a first region coupled to the laminate panel, and a second region coupled to one or more anchor point affixed to the chassis;
the platform further comprises a loudspeaker driver, the driver coupled to the battery and to the piezoelectric elements, the driver to output to the elements a high voltage electrical signal based on the audio signal.

9. The mobile computing platform of claim 7, wherein:
a front-side of the dielectric membrane is mounted to the speaker actuator; and
a back-side of the dielectric membrane is affixed to an interior surface of a back-side cover that is physically coupled to the chassis, the dielectric membrane forming a continuous seal to the back-side cover that forms a perimeter about the conductive traces.

10. The mobile computing platform of claim 9, wherein:
the back-side of the dielectric membrane is affixed to a mechanical stiffener, the stiffener covering the conductive traces; and
the dielectric membrane suspends the stiffener from the back-side cover.

11. The mobile computing platform of claim 7, wherein:
an area of the dielectric membrane is at least 9 $cm^2$;
the dielectric membrane has a mass no greater than 50 g; and
the first loudspeaker has a resonance frequency below 750 Hz.

12. The mobile computing platform of claim 7, further comprising:
one or more micro-loudspeakers coupled to the processor to receive the audio signal and to generate a second acoustic output, the micro-loudspeakers having a different frequency response than that of the first loudspeaker.

13. The mobile computing platform of claim 12, wherein:
the first loudspeaker has a resonance frequency below 750 Hz; and
the micro-loudspeakers have a resonance frequency above 1 KHz.

14. The mobile computing platform of claim 13, wherein the micro-loudspeakers lack an acoustically sealed back-side cavity.

15. A method of assembling a mobile computing platform, the method comprising:
receiving a chassis encircling a cavity;
affixing a speaker actuator to the chassis;
affixing a display to a front-side of the chassis;
mounting an inductive element to an interior surface of a back cover, the inductive element including one or more conductive traces disposed on a dielectric membrane, the conductive traces forming one or more inductive loop;
physically coupling a speaker driver to the inductive element; and
affixing the back cover to the chassis.

16. The method of claim 15, wherein mounting the inductive element further comprises bonding a perimeter of a dielectric membrane to the interior surface, and wherein one or more conductive traces are disposed on the dielectric membrane, the conductive traces comprising one or more inductive loop operable for at least one of inductive charging of a battery disposed within the chassis, or near field communication with the platform.

17. The method of claim 16, wherein the speaker actuator comprises one or more piezoelectric elements; and
wherein affixing the back cover to the chassis induces contact between a surface of the dielectric membrane and an elastomeric material bonded to the piezoelectric elements.

18. A method of operating a mobile computing platform, the method comprising:
powering a processor of the platform with a battery disposed within a chassis of the platform;
decoding a digital audio stream into a first audio signal with the processor;
generating a first acoustic output by displacing a dielectric membrane relative to the chassis based on the audio signal; and
inductively charging the battery from an alternating current power source external to the chassis through one or more conductive traces disposed on the dielectric membrane, the conductive traces forming one or more inductive loop.

19. The method of claim 18, further comprising:
generating a second acoustic output with one or more micro-speakers coupled to the processor to receive the audio signal, wherein the second acoustic output has a different frequency response than that of the first acoustic output.

20. The method of claim 18, wherein displacing the dielectric membrane further comprises outputting to one or more piezoelectric elements a high voltage electrical signal derived from the audio signal.

21. One or more non-transitory computer-readable storage media, with instructions stored thereon, which when executed by a processor, cause the processor to perform a method comprising:
decoding a digital audio stream into a first audio signal;
generating a first acoustic output by displacing a dielectric membrane relative to a chassis of the platform based on the audio signal; and
inductively charging a battery disposed within the chassis from an alternating current power source external to the chassis through one or more conductive traces disposed on the dielectric membrane, the conductive traces forming one or more inductive loop.

22. The media of claim 21, further comprising instructions to cause the processor to generate a second acoustic output with one or more micro-speakers coupled to the processor, wherein the second acoustic output has a different frequency response than that of the first acoustic output.

* * * * *